United States Patent [19]

Vogeley et al.

[11] Patent Number: 5,422,693
[45] Date of Patent: * Jun. 6, 1995

[54] METHOD AND APPARATUS FOR INTERACTING WITH A COMPUTER GENERATED PROJECTED IMAGE

[75] Inventors: James H. Vogeley; Arthur W. Vogeley, both of Yorktown, Va.

[73] Assignee: nView Corporation, Newport News, Va.

[*] Notice: The portion of the term of this patent subsequent to Aug. 10, 2010 has been disclaimed.

[21] Appl. No.: 69,001

[22] Filed: May 28, 1993

Related U.S. Application Data

[63] Continuation-in-part of Ser. No. 698,091, May 10, 1991, Pat. No. 5,235,363.

[51] Int. Cl.⁶ .................. G03B 21/00; G09G 3/02
[52] U.S. Cl. ........................ 353/122; 353/42; 345/158
[58] Field of Search ............ 353/122, 121, 48, 46, 353/42, 29; 340/706, 707, 705

[56] References Cited

U.S. PATENT DOCUMENTS

| | | | |
|---|---|---|---|
| 4,565,999 | 1/1986 | King et al. | 340/706 |
| 4,844,476 | 7/1989 | Becker | 340/707 |
| 5,114,224 | 5/1992 | Miyamoto et al. | 353/122 |
| 5,235,363 | 8/1993 | Vogeley et al. | 353/122 |

Primary Examiner—William A. Cuchlinski, Jr.
Assistant Examiner—William C. Dowling
Attorney, Agent, or Firm—Nixon & Vanderhye

[57] ABSTRACT

Disclosed is a method and apparatus for one or more operators to interact with a computer-controlled image projection-system. An operator-controlled radiation projector projects a beam of radiation which may be visible or invisible on the image created by the computer-controlled image projection system. A position sensing device determines the position of the projected radiation relative to the projected image and provides position information to the computer. In a preferred embodiment, the computer can then generate an additional image at or related to the spot of radiation permitting the operator to draw or paint pictures on the computer-projected image. In an additional preferred embodiment, the use of the position sensing device can be utilized to sense the position of a spot projected by one or more of a multiple gun projector which in a closed loop feedback loop can be used to control alignment of images projected by the multiple gun projector. In a preferred three-gun projector embodiment, the relationship between a spot projected by one or more projectors and its position as determined by two or less position sensors results in accurate alignment in translation, roll and magnification.

29 Claims, 6 Drawing Sheets

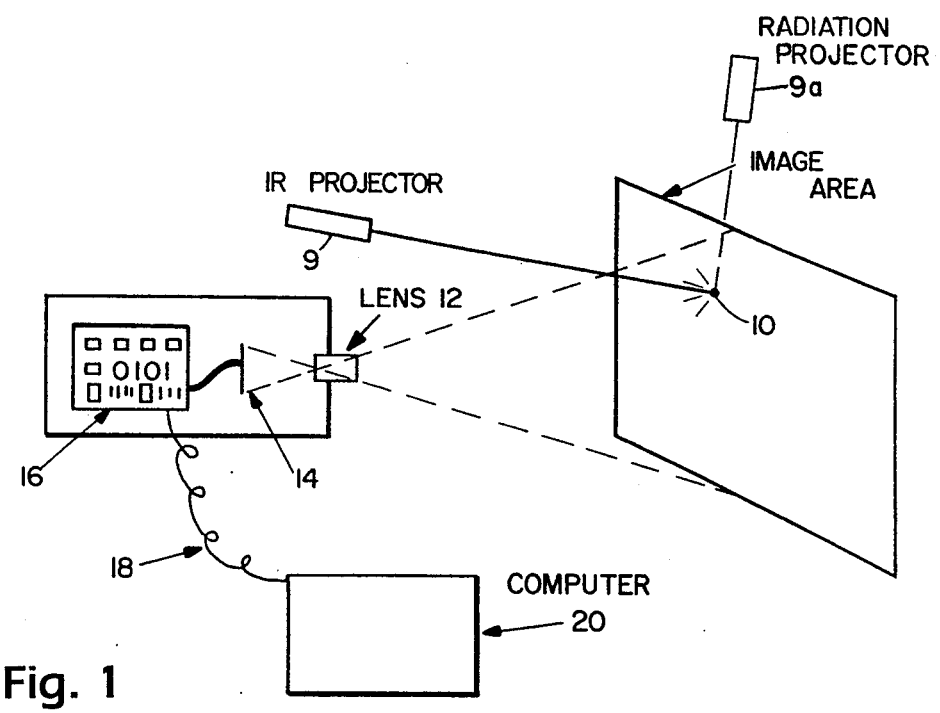
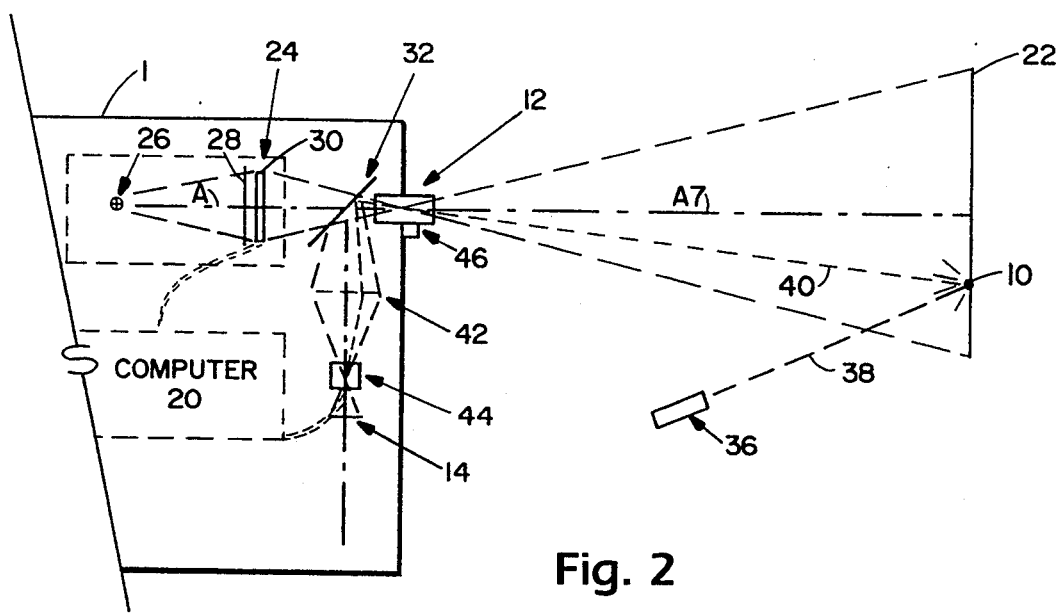

METHOD AND APPARATUS FOR INTERACTING WITH A COMPUTER GENERATED PROJECTED IMAGE

This is a continuation-in-part of application Ser. No. 07/698,091 filed May 10, 1991, now U.S. Pat. No. 5,235,363.

BACKGROUND AND SUMMARY OF THE INVENTION

1. Field of the Invention

The present invention relates generally to computer-controlled image projectors and specifically to interaction between an operator and the computer-controlled image being projected, as well as a means for automatically adjusting alignment of beams in a multi-beam projector.

2. Discussion of Prior Art

A wide variety of devices have been produced for permitting an operator to manually interact with a computer and imagery produced therefrom. Such devices includes the "mouse", a "track ball", a joystick, a touch screen and an electronic chalkboard.

The "mouse" is a device in which a ball is rolled over a surface and the amount of roll is sensed and governs the incremental movement of a computer generated position indicator, such as a cursor on the screen from an initial point on the image to some desired destination point. In order to accommodate slippage or sticking between the ball and the surface, there is generally no fixed relationship between the orientation of the ball and any image point. Efficient operation requires a certain amount of practice and/or training by the operator.

Similarly, the "track ball" is mounted for rotation in a fixed position and the ball is rotated by the operator's hand or fingers with the same general effect as the mouse, i.e. movement of a computer-generated position indicator.

A joystick, as in an airplane control device, is a control stick that can be tilted in two axes. Although the tilt angle may be directly related to the image location, precision of the operation is difficult to achieve. Alternatively, in some embodiments, the tilt angle is used to establish the rate of movement with the tilt direction indicative of the direction of movement of the cursor. Efficient operation of such a device is definitely a learned operation.

A light pen device is utilized with a raster-scanned cathode ray tube (CRT) wherein a light detector at the tip of the pen senses passage of the CRT electron beam, making it possible to time-relate beam passage to pen-/image location. Pointing accuracy Or resolution is affected by the distance between the light pen and the phosphor layer and is degraded by faceplate thickness, glare filters, etc. While such a device is useable with projected CRT imagery, it is not useable with non-scanned and/or matrix-addressed imagery (three color projection systems, LCD projection systems, etc.).

Touch screen systems utilize a stylus which is brought into close proximity to the screen image and the location of the stylus is sensed by means of its interaction with a reference field established over the image and generated optically, magnetically, inductively or otherwise. The "reference field" requirement makes it necessary to fix the image size and ease of operation and resolution cannot be improved by enlargement of the image.

The electronic chalkboard is a device like a blackboard or a writing tablet which can be written upon and the writing can be sensed in some fashion as with a touch screen for later storage and printout. Unlike a touch screen, erasure and correction becomes somewhat complicated. Like a touch screen, cost and complexity tend to be strongly affected by image size.

The difficulty with all of the above devices is that they are generally cable connected to a computer. Although cordless versions of some are available, implementation of this feature is relatively costly and complex.

Additional difficulties with the above (except perhaps the electronic chalkboard) are that their use is not intuitive, requiring the learning and practice of unfamiliar manual techniques. Precise and tedious operation is generally required in order to operate down to the resolution of most imagery.

An additional problem exists where multi-beam projectors create a composite image, made up of overlapping images projected from two or more beam projection systems. The most common of these is the conventional three-gun projection television in which a separate gun, one for each of three primary colors, projects its respective image on a screen. The three images when properly aligned with one another create a composite color image. Unfortunately, if the distance between the projector and the screen changes, the coincidence of three images will also change leading to an unfocused image appearance.

Furthermore, even without changing the distance between the projector and the viewing screen, temperature changes and other environmental effects can cause the three-gun projection system to go out of adjustment resulting in misaligned images and a deteriorated image quality.

SUMMARY OF THE INVENTION

It is therefore an object of the present invention to permit manual interaction with a computer-generated image.

It is a further object to permit such operation, regardless of whether it is front-projected or rear-projected imagery.

It is a further object of the present invention to be able to operate without constraint on image size.

It is a still further object of the present invention to interact with a computer without a physical, mechanical, magnetic, or optical connection or other interaction with the computer projection equipment, except for a cordless (IR or RF) data link.

It is an additional object of the present invention to permit intuitive operation, rather than requiring a learned activity, with respect to interaction with a computer generated image.

It is also a further object to have the cost and compactness of the present invention essentially fixed and independent of image size.

It is a further object-of the present invention to provide a system for automatically adjusting the projection direction of a three-gun projector so as to achieve alignment among the projected images.

It is an additional object of the present invention to provide a system for adjusting a multiple gun projection system so as to correct for misalignment caused by (1) relative translation of the respective images, (2) relative rotation of the respective images and/or (3) relative magnification changes in the respective images.

It is a still further object to provide a system in which a multi-gun projector points and focuses each of its image beams upon a designated alignment spot.

The above and other objects are achieved by providing an operator-controlled radiation projector capable of projecting controlled radiation onto either a front or rear projection screen to which the computer-controlled image projection system supplies an image. A position sensor is utilized in conjunction with the computer-controlled image projector system to determine the position of the operator-controlled radiation and provide an output to the computer indicative of such position information. This feedback to the computer allows the computer to interact with the operator and, in a preferred embodiment, allows the computer to "paint" a visible image on the screen at the location of the projected radiation or at least at a position related thereto.

The above and other objects with respect to multi-beam projector alignment are achieved by providing a spot on the image surface whose position relative to the images generated by each of the projection guns can be sensed. Once the position of the spot is sensed relative to each of the projectors, the projection direction of each projector can be adjusted so that the spot is in the identical position in each of the images and therefore the images themselves will be coincident. In order to sense the spot position, relative to a single projector, the same position sensor is utilized and, advantageously, may utilize the projector's optical path to insure accurate alignment.

In one of the three gun alignment embodiments, a single projector projects at least one spot as its image. Each of the other two projectors, utilizing respective position sensors, sense the position of that spot relative to their own projected images. This position information is provided to a computer which then derives the vertical and horizontal translation error, the rotational error and/or the magnification error and provides an appropriate control signal to a projector adjustment mechanism. A modification of this embodiment utilizes two projectors projecting spots at different times with the position of those spots sensed by a position sensor associated with the third projector. After the position of spots from the respective two projectors are sensed, the computer provides the adjustment information to two of the projectors so that alignment is achieved.

BRIEF DESCRIPTION OF THE DRAWINGS

The present invention will be more easily understood and appreciated by reference to the attached drawings, wherein:

FIG. 1 is a block diagram illustrating the elements of a position sensing means in accordance with one aspect of the present invention;

FIG. 2 is a schematic view illustrating the elements and operation of the present invention;

DETAILED DESCRIPTION OF THE DRAWINGS

Figure 3:
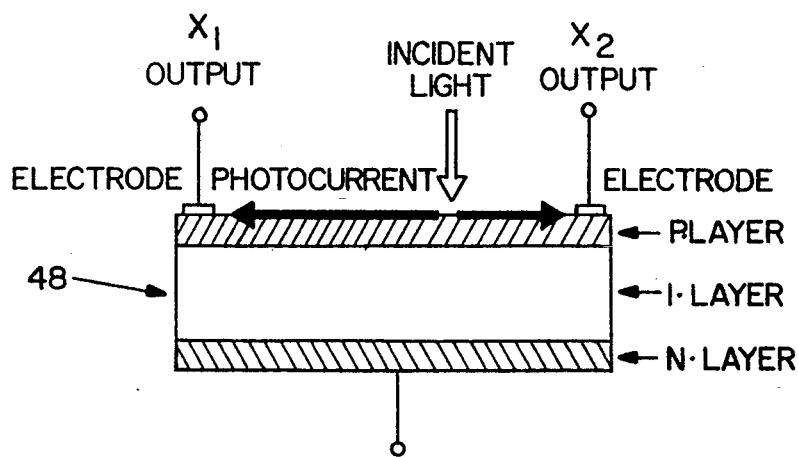
FIG. 3 is a cross-sectional view of a position sensing diode utilized in one embodiment of the present invention.

The following discussion is with respect to the Figures and similar reference numerals are utilized in the Figures to indicate similar elements.

FIG. 1 illustrates the principle upon which the operator-controlled radiation position is sensed. In the embodiment, an operator-controlled radiation projector 9 transmits infra-red radiation which impinges on the image area at spot 10. If the image area is a front-projection screen, the infra-red radiation is reflected off of the screen. If the image area is a back-projection screen, the operator-controlled radiation projector could be on the other side of the screen and provides a refractive/scattered radiation from spot 10. While a reflective system would have to have the radiation projector on the same side of the screen as the image projection system, a back projection system could have the radiation projector on the same or opposite side from the computer-controlled image projection system (since some of the radiation projector will be reflected and some will be refracted through the screen and in either instance it could be sensed) as shown by alternative radiation projector 9a.

Reflected or refracted radiation from radiation spot 10 (and it is noted that the spot could certainly be of any geometric shape or shapes or indeed any image that was desirable) is focussed through lens 12 onto sensor means 14 which may be any form of photosensor capable of outputting a signal for processing and interpretation to define the radiation position on the focussed image area. The sensor means 14 may either be analog (area diode, vidicon tube, etc.) or digital (charge coupled diode (CCD), area or linear) in nature.

One preferred embodiment of the present invention, which is illustrated is the position sensing diode which will be discussed in detail with respect to FIGS. 3 through 7 elsewhere.

Regardless of the actual device utilized as the position sensor, a signal containing position information is provided to the electronics which provides, through data link 18, position information to computer 20. The existence or non-existence of operator-controlled radiation at an appropriate position on the image area could comprise an operator controlled input to the computer accomplishing the desired result of the broad aspect of the present invention.

For example, should the computer program have a multiple choice question displayed in the image area with boxes next to the alternate answers, the operator being questioned could merely point a radiation projector at the particular box indicative of his or her answer choice. If the position sensing means indicates radiation from the image area at that position, the computer would register the indicated answer as the subject's answer for that question and go on to the next question. Thus, in its most simplified form, the device acts as a position sensor and permits interaction with a computer program which displays an image on the image area.

Of course, when the computer utilizes the position information to generate a corresponding image at or in some relation to the spot 10, then it is possible for the operator to utilize the current system to "write", "paint" or otherwise affect the image and interact with the computer, perhaps in the fashion of a computer-aided design, computer-aided machining (CAD/CAM) system.

Such a system embodiment is illustrated in FIG. 2. Image surface 22 is illuminated by a computer-controlled image projection system which in turn is controlled by computer 20. In the illustrated embodiment, the computer-controlled image projection system comprises an illumination source 26, a lens 28 and a liquid crystal display (LCD) panel for generating a computer-controlled image along optical axis A. An example of such an LCD system is disclosed in U.S. Pat. No. 4,763,993 issued to Vogeley on Aug. 16, 1988 (herein incorporated by reference).

With such LCD systems, black and white, as well as color, images can be front or back-projected onto suitable screens for viewing. The image from LCD 30 passes through beamsplitting mirror 32 through projection lens 12 and is projected upon the image surface 22 along a projection light optical path.

An operator-controlled radiation projector 36 supplies a beam of radiation 38 which contacts image surface 22 at spot 10 (in one embodiment a laser light beam). Beam 38 is at least partially reflected (in the case of a front projection system) or refracted (in the case of a rear projection screen) with a portion of the radiation travelling along a reflected light optical path which can be at least partially coincident with the original image beam path from the computer-controlled image projector system, said path indicated as dotted line 40. It should be remembered that the radiation travelling along path 40 can be visible or invisible to the operator.

The radiation travels through projection lens 12 and is reflected by beamsplitter mirror 32 through return image lens 42 through image reduction lens 44 to sensor means 14 where the position of radiation spot 10 is provided to computer 20.

Conveniently, the above components, with the exception of the operator-controlled radiation projector and the image surface 22, can be conveniently mounted in housing 1 as shown. Not shown are the other components which may also be advantageously incorporated into housing 1, such as additional lenses or cooling systems for the projector illumination source 26, the sensor means 14 as well as LCD 30, and other control systems for computer 20, including power supplies, etc.

It should be noted that the computer-controlled image projection systems, such as in the illustrated embodiment including one or more liquid crystal panels, are reasonably well known. In a preferred embodiment of the liquid crystal panel embodiment, one or more liquid crystals are associated with one or more polarizers, filters, etc. required for generating monochromatic or color images. The LCD panels may be "passive" or "active" matrix type panels where such "active" type panels are also known as thin film transistor (TFT) LCD panels. The panels may be made of any type of material (twisted nematic, supertwisted nematic, ferroelectric, electrophoretic, etc.) or other materials not yet known, which are suitable for projection. Alternatively, instead of utilizing LCD panels, the system may comprise a projection CRT system such as those currently in use with large screen projection television systems. Lens 12 can be any variety of projection optics suitable for focussing and forming an image from the computer-controlled image projection system onto the image surface 22.

It is further noted that the sensor means is located in the vicinity of the optical axis of radiation deflected by beamsplitter mirror 32. Obviously, dependent upon the angle of the beamsplitter mirror, the position of sensor means 14 will change if it is to be supplied with an image from image surface 22. The benefit of locating sensor means 14 on the optical axis A, as reflected by beamsplitter mirror 32, is to take maximum advantage of the Optical Law of Reciprocity. This law states, essentially that object and image are interchangeable, resulting in a number of non-obvious benefits to the present arrangement which will be enumerated below.

In addition to the obvious benefits of compactness, cost, etc. by utilizing the same optic path for the projected image, the reflected operator-controlled system on the same optical axis is as follows. According to the Optical Law, the image formed on image surface 22 will be reflected back along the optical axis in exactly the same size and shape as originally transmitted. The beamsplitter mirror allows the sensor means to be positioned optically at the same position as the object (formed by the computer-controlled image projector system 24 and located at LCD 30). However, this would require a sensor means of essentially the same size as the LCD and such a large sensor means is not necessary.

In a preferred embodiment, use can be made of a generally smaller and relatively inexpensive charge coupled diode (CCD) type sensor, such as those found in portable video cameras or a relatively small position sensing diode (PSD), which will be subsequently discussed in detail. In order to reduce the radiation returning along return path 40 to a size compatible with the sensor means, an image reduction lens 44 is utilized.

It is also noted that the beamsplitter functions to divide the optical path as noted above. Where in most cases the optical image projected by the image projection system 24 is in the visible light range, it is possible that the radiation transmitted by the operator controlled radiation projector and reflected or refracted from the image surface along return path 40 may be invisible infra-red radiation. The beamsplitter will serve to separate the visible from the infra-red perhaps permitting only the infra-red to be reflected through the return image lens and the image reduction lens to the sensor means 14. The beamsplitter mirror could be comprised of a dichroic mirror, pellicle, a "cold" mirror or other equivalent device.

The benefits accrued by utilizing the Optical Reciprocity Law are as follows:

(1) Focussing the LCD object onto image surface 22 automatically focuses the return image of radiation spot 10 along return path 40 onto the sensor means;

(2) Any optical distortions (pincushion, barrel, etc.) to the projected image produced by the projection lens are automatically cancelled and eliminated in the image return to the sensor means;

(3) Any viewing distortions (keystoning, etc.) produced by non-optimum alignment of the image surface 22 with the optical axis "A" are also eliminated at the sensor means;

(4) Placing both the object (LCD) and image (sensor) on a single optical axis avoids parallax effects and thereby eliminates the need for performing any coordinate conversions to relate the sensor image position information to the actual position of radiation spot 10.

Quite clearly, the positions of the projector and sensor elements and their respective lenses could be reversed or otherwise modified depending upon the desired physical arrangement. Appropriate adjustments and/or changes to the beamsplitter mirror 32, as well as the inclusion of additional mirrors and/or lenses would be appropriate. It is also clear, that although there are advantages to utilizing a single projection lens and a single optical axis, dual lenses (mounted closely together, parallel and coupled to operate in unison) and dual optical axes could be used. Such an arrangement eliminates the requirement of a beamsplitter but requires that suitable visible and IR light filters be provided so as to distinguish between perceived light. Such a configuration preserves the benefits of the reciprocity law, except for the introduction of a small amount of parallax which can be accommodated by suitable corrections in the computer software as relates to the position information from the image sensor.

The operator-controlled radiation projector 36 can comprise a number of different forms which provide great flexibility in operation. While the most common form of the radiation projector 36 would be a device similar to a writing implement or pointer in which the beam 38 is directed towards image surface 22 from a distance, the device could also be utilized in close or direct contact with the viewing surface. While the radiation could be visible at a single frequency (as in a laser source) with the position sensor tuned to that frequency, it could also be pulse code modulated so as to differentiate it from other visible radiation. In a preferred embodiment, the radiation is infrared so that it is not visably detectable by the operator of the system.

The projector in one embodiment could include a visible light beam which is not sensed by the position sending device and another beam whose position is sensed, where the sensed beam can be turned on and off by the operator. This allows the operator to designate portions of the projected image (when the sensed beam is off) and then interact with the computer and change the projected image by "writing", "painting", "erasing", etc. (when the sensed beam is on). As previously noted, while radiation spot 10 is shown as being a point or small dot of light, it could be any desired symbol or symbols including a circle, a rectangle, etc. In the dual beam embodiment discussed, the visible beam could be a circle with the invisible beam covering the circle with the computer programmed to erase any image covered by the invisible beam. The computer could also be limited so as to erase only images previously added by the "writing" or "painting" by the operator on the image.

For front-projection embodiments, the IR light in a preferred embodiment would be transmitted directly toward the sensor, or, alternatively, directed toward the image surface and then reflected back to the sensor. In such an embodiment, the image surface 22 could be coated with a material which emits a different type of radiation when illuminated with a first type of radiation. Examples of such materials are florescent materials which give off visible light when illuminated by ultraviolet light.

In any event, the light, visible or otherwise, from radiation spot 10 should spread sufficiently such that a portion of the light is directed along return path 40 so as to be sensed by sensor means 14. Conversely for a rear-projection embodiment, the visible or the operator-controlled radiation would be directed by the operator towards the imaging surface where it would pass through the surface and, after spreading somewhat, be detected on the other side.

The operator-controlled radiation projector 36 could have a number of additional features which render the device extremely utilitarian. Unlike the touch screen and other prior art devices, which are limited to well defined and generally small areas and which, incidentally, generally require a cable connection between the image surface and the computer-controlled image projection system, the present operator-controlled radiation projector 36 could quite easily be cordless for its mobility attributes. Cordless operation is readily provided by internal battery power of the radiation generator of the beam 38.

Because commands such as off/on, start/stop, color selection, etc. are generally transmitted through the connecting cable of prior art devices, the preferred cordless form of the operator-controlled radiation projector 36 utilizes further unique and novel aspects. The device would include a variable frequency oscillator for turning the IR illumination on or off.

The projector 36 can transmit in a number of discrete fixed and selectable frequencies determined by any one of a number of electronic means where a separate frequency or pulse code is provided equal in number to the number of separate commands desired. The commands and appropriate frequencies are selected by suitable actuators (buttons, switches, etc.) controlled by the operator. Such information on frequency, pulse code, etc. generated by the operator-controlled radiation projector 36 is sensed by frequency detector 46 and control information can be provided directly to computer 20.

Figure 4:
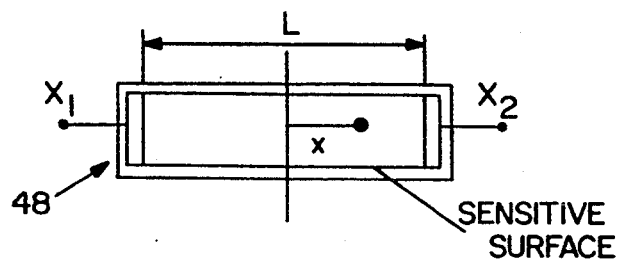
FIG. 4 is a top view of a one dimensional position sensing diode.
Figure 5:
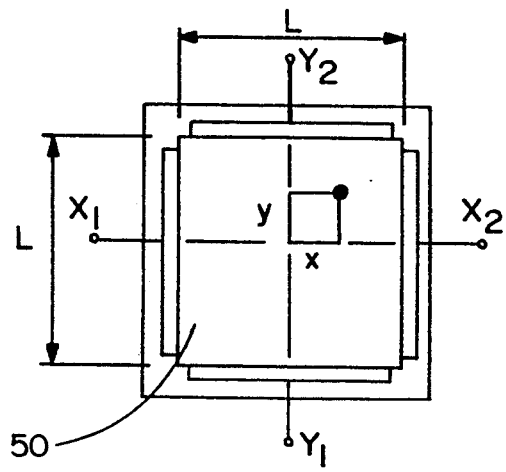
FIG. 5 is a top view of a two dimensional position sensing diode.

A preferred embodiment of the sensor means 14 is a position sensing diode (PSD) which is illustrated in FIGS. 3 through 5. In FIG. 3, there is shown a typical PSD consisting of a P layer, an I layer and an N layer. When a light spot falls on the sensitive surface of a PSD, an electric charge proportional to the light energy is generated at the incident position. The charge is driven through the resistive P layer and collected by the electrodes. Since the resistivity of the P layer is uniform, the photocurrent collected by an electrode is inversely proportional to the distance between the incident position and the electrodes. Therefore, the difference between the electrode currents at the respective two outputs when divided by the sum of the currents provides an indication of the position of the light incident thereon.

FIG. 4 is a top view of the PSD shown in FIG. 3 which in fact would comprise a one-dimensional PSD system. It is obvious that if the incident light spot were on the center line (immediately below "L"), equal current would go to both electrodes and the difference current would be zero. The following formula provides the indication of the incident spot a distance x from the center line position as shown:

$$\frac{X_2 - X_1}{X_1 + X_2} = \frac{2X}{L}$$

where $X_1$ is the current at electrode $X_1$, $X_2$ is the current at $X_2$, and L is the distance between the two electrodes.

FIG. 5 illustrates a two-dimensional PSD in a square arrangement and the above formula still applies with respect to the distance x from the center array along the horizontal axis. The following formula provides the distance Y in a vertical direction from the center of the array:

$$\frac{Y_2 - Y_1}{Y_1 + Y_2} = \frac{2Y}{L}$$

where $Y_1$ is the current at electrode $Y_1$ and $Y_2$ is the current at electrode $Y_2$.

Position sensing diodes have typical position detection errors of 0.1% or 1 part per one thousand. This accuracy level is more than sufficient for use with present LCD panels having a resolution of 640×480 pixels. Importantly, the response time of a PSD is fast enough for use of the PSD with frequencies as high as 35 Kilohertz. As we shall see, this high frequency response provides a number of benefits when the PSD is utilized as the preferred sensor means.

For example, the operator-controlled radiation projector 36 can output a visible light in the form of square waves at frequencies (for command functions) up to 35 Kilohertz. Since the light from the computer-controlled image projector system 24 fluctuates at frame rate frequencies on the order of 100 Hertz or less, discrimination between the two sources of light can be made on the basis of frequency. Narrow band filters, tunable to the various operator-controlled radiation projector frequencies (when used as command signals) would easily separate operator-control signals from the image return. In such an embodiment, the operator-controlled radiation projector would be a light emitting diode (LED) or laser diode in order to operate at frequencies in the Kilohertz range.

An added benefit of using such sources is that pulsing permits operation at light outputs considerably higher than the values allowed under steady state operation (given a constant power requirement). A benefit of using a visible radiation spot 10 (as opposed to non-visible IR or UV) is that it provides immediate feedback to the operator utilizing the projector, especially when it is being used as a pointer. In a preferred embodiment, digital filters, as opposed to analog filters could be used. These filters may be of a number of different configurations and have advantages over analog filters as follows:

They are stable with little or no drift with time and/or temperature. They are repeatable in that the component values are replaced by digital parameters. They are adaptable such that parameters are programmable and reconfigureable. Digital filters require digitized input values. The resolution of the A/D converters depends upon the requirements with respect to the visible image. For example, for use with an LCD based computer-controlled image projection system 24 where the LCD has 640×480 pixel resolution, a ten-bit converter is required to achieve greater than one part in 640 accuracy.

Figure 6:
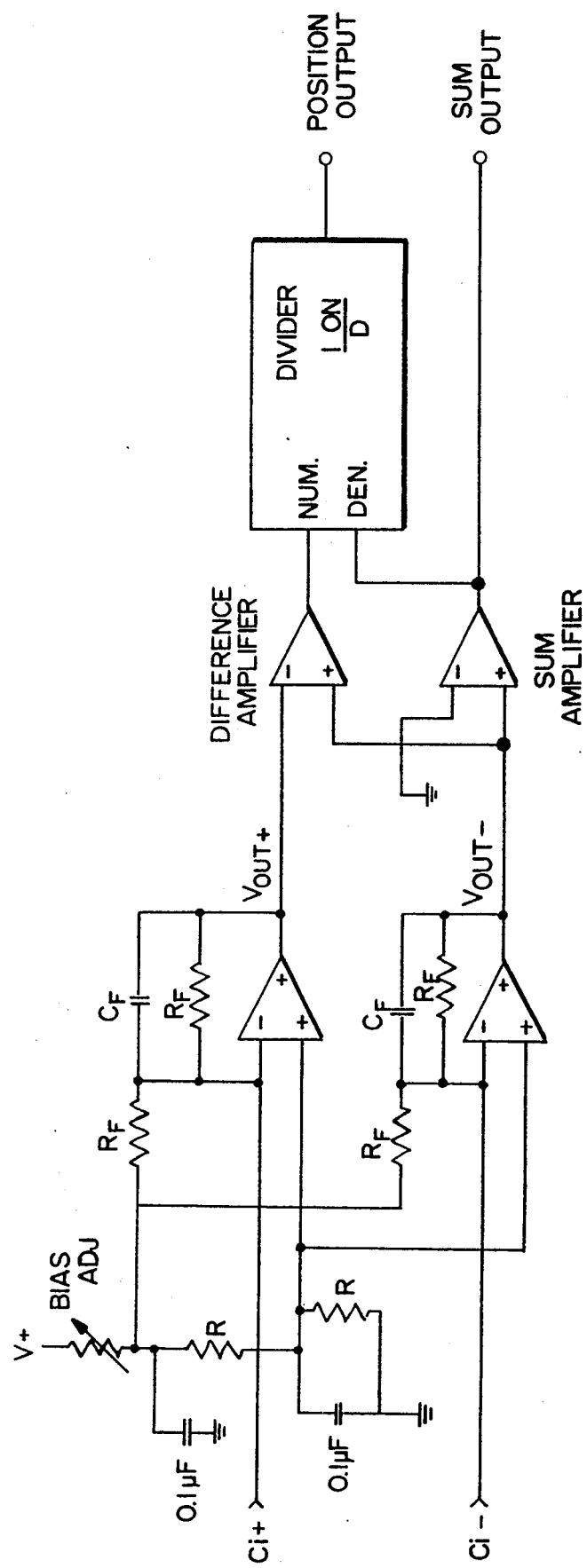
FIG. 6 is an electrical schematic diagram of a circuit for processing the output of a position sensing diode.

Reference to FIG. 6 may be had which shows one preferred circuit for position calculations with respect to a PSD. A combination of operational amplifiers performs the sum and difference calculations followed by a division circuit to provide the output position information as per the above formulas. A similar circuit could be utilized for both vertical and horizontal position information. Although the FIG. 6 circuit operates in an analog fashion, it could be followed by analog-to-digital converters feeding into digital filters as discussed above wherein the information is further processed by computer 20. Where appropriate, the computer itself could be utilized to process the above information or a separate embedded microprocessor could be dedicated to this system. In either instance, the computer system utilized would include the A/D converter control, digital filtering, frequency shifting to match the operator-controlled radiation projector frequencies, calibration, etc.

Operation of such a device using the position sensing diode would be similar to that previously discussed with respect to a charge coupled diode or other light responsive element. However, the use of a visible light, instead of IR or some other invisible radiation, makes it possible to completely automate and rapidly carry out the calibration procedure that could accommodate the use of separate non-coaxial, unmatched and relatively inexpensive sensor optics. Such calibration procedure would, of course, accommodate optics distortion such as keystoning and other types of distortion.

Additionally, such implementation lends the present system applicable as a stand-alone unit accessory to existing LCD. or CRT projection systems. One calibration procedure would be as follows:

(1) The LCD or CRT projector would be programmed to present a dark background image.
(2) In rapid sequence, a number of single, bright points of light at known locations on the image would be programmed to cover (in grid form) the projected image.
(3) The system would measure the positions on the sensor of these points of light and enter them into a lookup table.
(4) In use then, the sensor position of the operator-controlled radiation projector would be compared to the lookup table values and interpolated to provide the accurate, corresponding projected image location automatically corrected for keystoning, distortion, etc.

Even though visible light is being utilized, the frequency difference between the frequency of operation of the image projection system and the frequency operation of the operator-controlled radiation projector would clearly avoid confusion between the two signals. The benefit is that the filtering system can pass very low levels of the desired frequency while rejecting relatively high levels of the undesired frequency.

The signal to noise ratio can further be enhanced if the operator-controlled radiation projector as previously noted, uses pulse code modulation and transmits a specific code and the position sensing diode looks for this coded pulse and then provides an output with respect to the modulation code.

Therefore, the benefits of the position sensing diode's high frequency response can be effectively utilized to insure a high signal-to-noise ratio of visible light projected from the radiation projector without having it so bright that it takes away or distracts from the image provided by computer-controlled image projector system.

In view of the above, a number of benefits of the present invention can be seen. Regardless of the projection distance, the sensor means can accurately determine the position of radiation spot 10 and provide this information to the computer. The information can be utilized to indicate an operator response to a computer generated question, or can be used to create a spot projected by the computer-controlled image projection system coincident with the radiation spot which remains on the image when the radiation spot 10 is moved or removed. A series of dots or other symbols can be projected and remain in place. In fact, it is exceedingly easy to write, draw and otherwise actively include and record movements of radiation spot 10 on the image by merely storing the radiation spot position and having the computer-controlled image projector generate a corresponding spot, line or other graphical image at that point.

Obviously, different colors could be generated by the computer-controlled image projector system in response to the position sensing of a radiation spot 10. However, the removal of colors or other computer generated imagery could also be accomplished with the radiation spot. For example, the radiation projector could be used as an eraser and, if it were given a geometric shape, movement of the radiation shape over a portion of the image area could cause the computer-controlled image projector system to also move and delete particular colors or images which are encountered by the radiation spot during movement.

Quite clearly and, dependent upon the desired objects, the device could be programmed to allow multiple operators to use multiple image projection systems, each one operating at a different frequency or pulse code modulation and allowing each different operator to "paint" on the image surface. Similarly, one or more projection systems could also be used to "erase" one or more of images "painted" on the image surface or portions of the image originally generated through the image projection system.

In view of the above, there are particular advantages in utilizing the present invention in conjunction with a computer-generated projected imagery (developing, modifying, annotating, etc.) during group computing sessions. The apparatus could also be used for recording material which is being electronically written on a conventional writing surface (blackboard, whiteboard, flip charts, etc.) in classrooms or lectures for later printout and distribution.

Psycho-physiological testing with direct recording and immediate analysis of the results could also be accomplished with the present device. Additionally, there is a distinct potential for game playing using pointing devices which comprise the operator-controlled radiation projector. Training by simulation in tasks such as aerial combat, jungle warfare, target detection, target practice, etc. could also be accomplished. Further, bulletin board, directory, schedule, route selection, etc. information call-up (from general to detailed) by pointing for use in transportation terminals, department-/catalog stores, museums, restaurants, etc. would also be highly advantageous. A further embodiment could also be advantageously used with respect to group critiquing and editing of large and/or complex computer-generated printouts.

The principle of the present invention i.e., the utilization of projection optics to focus light reflected from the projected image onto a position diode and thereby determine the relative position of an externally spot on the image, can also be advantageously applied to the problem of automatically converging multiple gun projectors so that that their resulted beams are coincident at the image surface. The term "spot" is used in this specification to denote any geometric form projected onto the image surface. As will be seen, this spot can be projected from another projection device or projected from a hand-held or fixed source. Again, although the previously disclosed embodiments use an LCD panel as a projector, the following reference to "projector guns" includes three-gun cathode ray tube (CRT) projectors, three-gun liquid crystal display (LCD) projectors or other types of projectors which utilize separate projection optics for each of two or more images which overlap in a desired manner.

Figure 7:
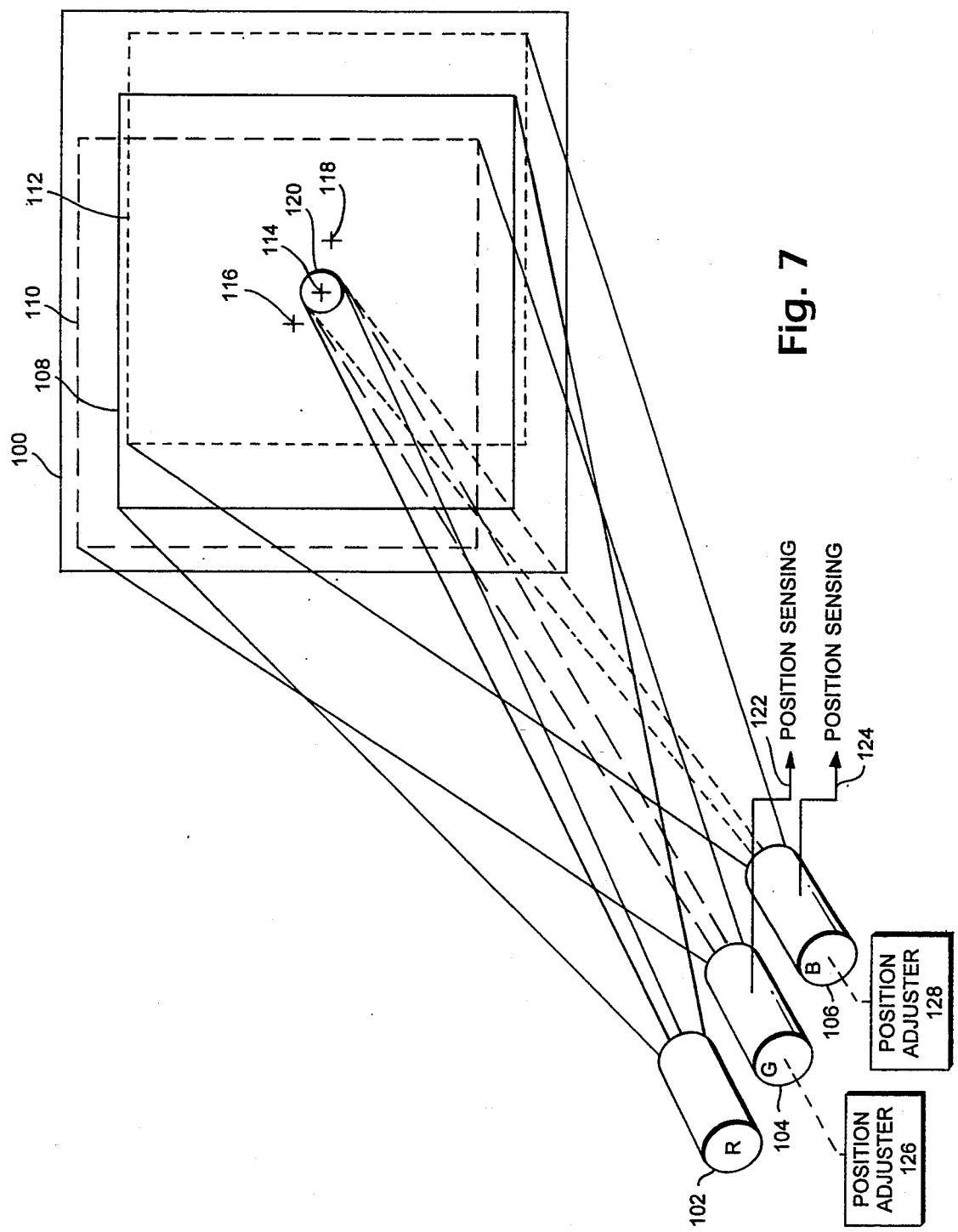
FIG. 7 is a perspective schematic view of a three gun projector using a single projected spot and two position sensors to automatically align the projected images.

The principle of the projector convergence application of the present invention can be understood by reference to FIG. 7 where the image surface is represented by screen 100. Three image projector guns 102, 104, 106 project red, green and blue images, respectively, on screen 100. It is observed that these projectors could be in any order and indeed could project colors other than red, green and blue without deviating from the spirit of the present invention. It can be seen that on screen 100 the red projector gun image 108 is essentially centered on screen 100. However, the green image 110 and the blue image 112 are not coincident and are displaced from the red image. The center of the red, green and blue images are indicated by crosses 114, 116 and 118, respectively.

In order to provide automatic convergence, the red projector gun 102 includes in its projected red image a spot 120. Pictorially the fact that spot 120 is projected from red projector gun 102 is indicated by the solid lines along the projection light optical path from the projector to the spot. Built into each of the green and blue projectors 104 and 106 are a beam splitter and position sensing diode or other equivalent image detector (such as discussed previously) so as to provide position sensing outputs 122 and 124, respectively. Light from spot 120 is reflected back through the respective projection light optical paths to the position sensors in the green and blue projectors, respectively (the same convention of using dashed and dotted lines to designate the images 110 and 112 from the green and blue projection guns, respectively, is used to designate the projection light optical paths).

In FIG. 7, it can be seen that the position of the spot 120, with respect to the green image 110, is displaced below and to the right of the center 116 of the green image and the position sensing output 122 will electronically indicate this position (in either analog or digital fashion). The position of spot 120 as sensed by the blue projector gun 106 will be to the left and slightly above the center of the blue gun's projected image 112 and its center 118. Again, the position sensing output 124 of the blue projector gun will indicate this position.

Because the relative position of each image is now known (because the red projector has projected image which includes the spot and therefore the spot position relative to the red image is inherently known), adjustments to any two projectors with respect to a third projector can be accomplished so as to achieve any desired relationship between the images. In a preferred embodiment the relationship is coincidence i.e., the centers of each of the three images will be coincidence.

In the FIG. 7 embodiment, position adjustor 126 is mechanically associated with the green projector gun and position adjustor 128 is mechanically associated with the blue projector gun and serves to translate and-/or rotate the guns until there is no error between the red spot and the same location on the image projected by the other two projection guns, i.e., "convergence".

It can be seen that it is unnecessary for the spot to be located at the center of the image as long as rotation of the image is not a problem. Similarly, however, if the projection guns can be adjusted not only in vertical and horizontal translation, but also in roll, it is desirable (although not absolutely necessary) to first adjust the images by translating the center of the images to be coincident and then, using an off center dot, adjust the images in roll for a complete coincidence. Also while the adjusters are shown to be associated with the blue and green guns which each have position sensors, an adjuster could also be associated with the spot projector and one position sensor (and they would be adjusted for coincidence on the remaining position sensor projector).

Figure 8:
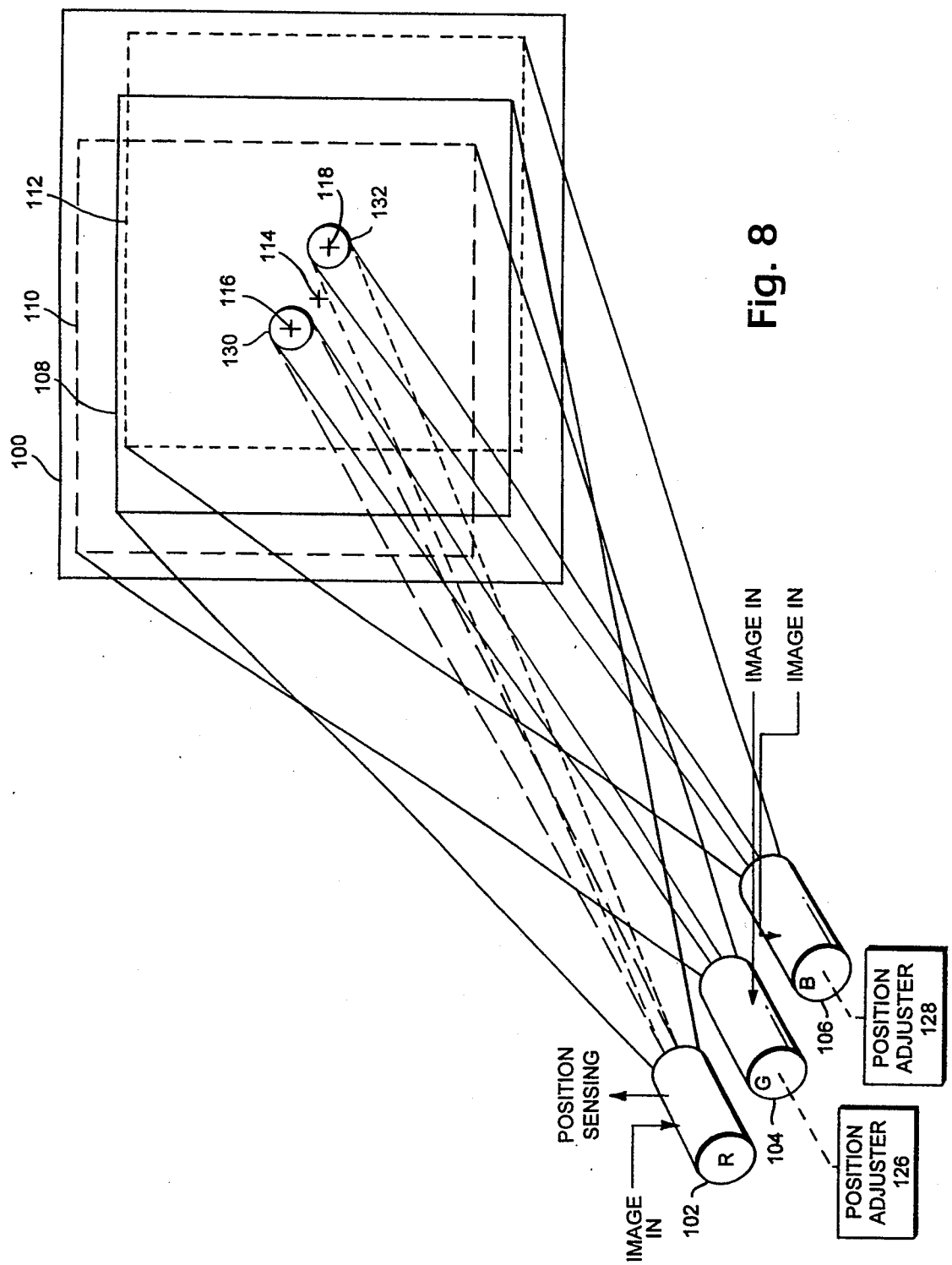
FIG. 8 is a perspective schematic view of a three gun projector using two projected spots with a single position sensor to automatically align the projected images.

FIG. 8 is a similar three-gun projector as discussed with reference to FIG. 7 with the same general misalignment of the green and blue projection guns as previously discussed. However, this embodiment uses only a single position sensing element for convergence adjustment. The green and blue projector guns transmit spots 130 and 132, respectively, at the same location in their respective images, but, because these images are displaced with respect to the red projector gun image, the spots are displaced relative to the center 114 of the red projected image 108. The fact that spots 130 and 132 are projected from respective green and blue projectors 104 and 106 is indicated by the solid lines connecting the spots with the projectors. Light reflecting from screen 100 along the optical path of red projector gun 102 is indicated in dashed and dotted lines (as are the respective outlines of images 110 and 112).

Because the position sensing diode senses only the center of illumination, the simultaneous projection of two spots would result in a position indication of the average of the two spots. In a preferred embodiment, the projection of the two spots is done sequentially. The spot 130 from green projector gun 104 would be generated on the screen and its position sensed by the position sensor in the red projector gun 102. Then the green projector gun would be disabled from projecting spot 130 and the blue projector gun would be enabled to project blue spot 132. Its position would then be sensed by the red projection gun position sensor. As with FIG. 7, once the three relative positions are known, the appropriate control signals can be applied to position adjusters 126 and 128 so that the three images are coincident.

Figure 9:
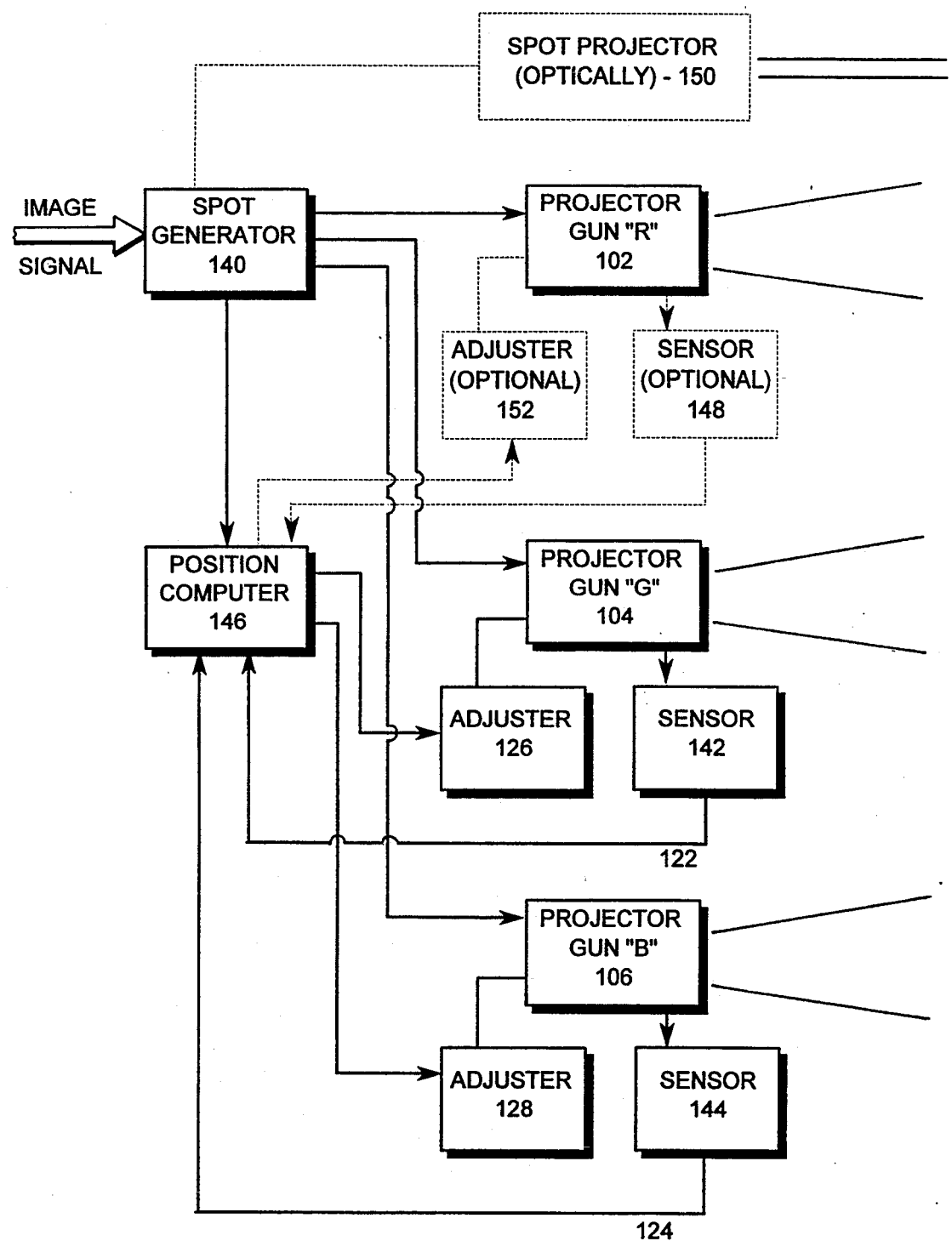
FIG. 9 is an electrical block diagram of the automatic convergence system in accordance with the present invention.

FIG. 9 illustrates a block electrical diagram for implementation of either the FIG. 7 or FIG. 8 embodiments. The image signal (whether from SECAM, PAL or NTSC video or from a computer generated video) is input to a spot generator 140 which provides the appropriate electronic signal to enable red projector gun 102 to generate a single spot (as in the FIG. 7 embodiment) or green projector gun 104 and blue projector gun 106 to project the sequential spots (as in the embodiment of FIG. 8).

Responsive to the projected spot in the FIG. 7 embodiment is green position sensor 142 and blue position sensor 144, which provide position sensing outputs 122 and 124, respectively. These outputs are applied to position computer 146 which, in addition to being provided with information on where the spot generator 140 has directed red projector gun 102 to project a spot, computes the position differences and provides error signals which are then applied to adjustor 126 and adjustor 128 so that the green projector gun 104 and the blue projector gun 106 are adjusted until their images are coincident upon the image from red projector gun 102.

With minor modification, the FIG. 9 apparatus could also operate in accordance with the embodiment disclosed in FIG. 8. This modification would utilize a single red position sensor 14 (indicated in dotted line as being optional). In this embodiment, of course, the green and blue position sensors 142 and 144, respectively, would not be needed. The spot generator 140 would sequentially command green projector gun 104 and blue projector gun 106 to project spots 130 and 132, respectively, at known positions relative to their image (it is not necessary that these images be projected at the same relative position).

Sensor 146 would sense the position of the spot projected by green projector gun 104 and provide this information to the position computer 146. Because the spot generator 140 provides the position computer 146 with the location of the spot which was commanded to be projected by green projected gun 104 and the actual position as sensed by sensor 148, the position difference and the adjustment necessary can be computed and applied to adjustor 126. Similarly, the spot 132 projected by blue projector gun 106 can be used to determine its relative misalignment. It should also be noted that, while, in a preferred embodiment, the position computer may compare the commanded position for the projected spot with the sensed position of the projector spot and provide an output based upon the error, it could also have a "constant" or offset incorporated so that the sensed position (where the spot is supposed to be positioned) is offset from the position in which the spot is commanded to be projected.

It is noted that in the FIG. 7 and FIG. 8 embodiments, one or two of the three projectors is utilized to provide the projected spot and two or one of the projectors incorporates a sensor which provides position information to the position computer which in turn adjusts two of the three projectors so as to achieve the desired level of convergence. Under some circumstances, it may be desirable to have all three projectors adjustable and to have them "slaved" in a particular relationship to an independently generated spot.

FIG. 9 illustrates an optional external spot projector 150 which may be a hand-held laser projector as discussed previously. Because this spot is not necessarily aligned with respect to the red projector gun 102, it is necessary to have a separate red position adjustor 152 in addition to the red position sensor 148. In this embodiment, each of the images projected by the red, green and blue projectors are "slaved" to a predetermined orientation with respect to the spot projected on screen 100 by spot projector 150. This system would have somewhat more flexibility than the embodiments disclosed in FIGS. 7 and 8, but would suffer from the requirement of having three separate projector gun adjustment mechanisms and three separate position sensors (one associated with each of the three-gun projectors).

In view of the above, translation in the vertical and horizontal directions can be corrected. As discussed, once convergence with respect to the center of the projected image is attained, then utilization of a dot projected towards the outer edge of the image will permit any roll adjustment or magnification of adjustment to be made. In the case of roll adjustment, if, after image center convergence is achieved, there is a rotational displacement between the actual and sensed spot positions, the offending projector can be rolled about its projection axis by the position adjustor to make the appropriate correction.

With respect to magnification correction, because of slight differences in optical path, changes in lenses and thermal factors, the magnification can vary slightly from gun to gun. Even with translation and roll corrected, the outer edges of the resulted image would lose definition should there be magnification differences among the projection guns. In the FIG. 7 embodiment, if the red projector gun 102 projects a spot first along the lefthand portion of its image and then along the righthand portion of the image with the two spots having a known separation distance. Spot position information is supplied, through the green and blue projector gun position sensors, and the computer computes the sensed distance between the spots with respect to the green and blue images. If the sensed distance is greater or less than the known separation distance, there is a magnification error which can be adjusted either electronically, in the case of a CRT, or by adjustment of the position of the liquid crystal display panel in an LCD projector.

The embodiment of FIG. 8 could measure magnification error in a similar manner except that the green and blue projector guns 102 and 104, respectively, would sequentially project a dot at two different positions on the screen which would be sensed by the red projector gun position sensor 148. Subsequently, the blue projector gun 106 would do the same, with the result that the computer would then calculate the known and sensed distances and adjust the magnification of the projector.

Therefore, and in view of the above description, those of ordinary skill in the art will appreciate there are many varied applications of the present invention as well as a plurality of embodiments depending upon the ultimate application. Accordingly, the present invention is not limited by way of the above discussion with respect to preferred embodiments and examples, but rather is limited only by the scope of the claims appended hereto.

What is claimed is:

1. An apparatus for providing relative positional information between a spot of radiation and an image projected along a projection light optical path onto an image surface, said apparatus comprising:
   at least one projecting means for projecting at least one image along a projection light optical path onto said image surface;
   means for providing at least one spot of radiation at at least one location along said projection light optical path;
   at least one position sensing means, in known alignment with said projection light optical path, for sensing the position of said at least one spot; and
   means, responsive to said alignment of said sensing means with said projection optical path and said sensed position of said at least one spot, for providing a signal indicative of a position of said at least one spot relative to said image on said image surface.

2. The apparatus according to claim 1, wherein said at least one position sensing means comprises a position sensing diode, responsive to light at least partially along said projection optical path including light from said image surface and light from said at least one spot, for providing an electrical output indicative of the position of said at least one spot relative to said image on said image surface.

3. An apparatus for providing relative positional information between a spot of radiation and an image projected along a projection light optical path onto an image surface, said apparatus comprising:
   at least one projecting means for projecting at least one image along a projection light optical path onto said image surface;
   means for providing at least one spot of radiation at at least one location along said projection light optical path;
   at least one position sensing means, in known alignment with said projection light optical path, for sensing the position of said at least one spot; and
   means, responsive to said alignment of said sensing means with said projection optical path and said sensed position of said at least one spot, for providing positional information about said at least one spot relative to said image on said image surface, wherein said at least one position sensing means comprises a position sensing diode, responsive to light at least partially along said projection optical path including light from said image surface and light from said at least one spot, for providing an electrical output indicative of the position of said at least one spot relative to said image on said image surface, wherein said at least one projecting means includes means for directing at least a portion of light from said image surface and light from said at least one spot to said position sensing diode.

4. An apparatus for providing relative positional information between a spot of radiation and an image projected along a projection light optical path onto an image surface, said apparatus comprising:
   at least one projecting means for projecting at least one image along a projection light optical path onto said image surface;
   means for providing at least one spot of radiation at at least one location along said projection light optical path;
   at least one position sensing means, in known alignment with said projection light optical path, for sensing the position of said at least one spot; and
   means, responsive to said alignment of said sensing means with said projection optical path and said sensed position of said at least one spot, for providing positional information about said at least one spot relative to said image on said image surface, wherein said means for providing at least one spot of radiation comprises a handheld laser pointer means for projecting a spot of laser radiation on said image surface under the control of an operator.

5. A method of providing relative positional information between a spot of radiation and an image projected along a projection light optical path onto an image surface, said method comprising the steps of:
   projecting at least one image along a projection light optical path onto said image surface;
   providing at least one spot of radiation at at least one location along said projection light optical path;
   sensing the position of said at least one spot with at least one position sensing means in known alignment with said projection light optical path; and providing, in response to said alignment of said sensing means with said projection optical path and said sensed position of said at least one spot, a signal indicative of a position of said at least one spot relative to said image on said image surface.

6. An apparatus for providing relative positional information between a spot of radiation and an image projected along a projection light optical path onto an image surface, said apparatus comprising:
at least one projecting means for projecting at least one image along a projection light optical path onto said image surface;
means for providing at least one spot of radiation at at least one location along said projection light optical path;
at least one position sensing means, in known alignment with said projection light optical path, for sensing the position of said at least one spot; and
means, responsive to said alignment of said sensing means with said projection optical path and said sensed position of said at least one spot, for providing positional information about said at least one spot relative to said image on said image surface, wherein:
said projecting means comprises at least two projecting means;
said means for providing at least one spot of radiation comprises a laser pointer means for projecting a spot of laser radiation on said image surface in known alignment with one of said at least two projecting means; and
said at least one position sensing means is in alignment with the other of said at least two projecting means.

7. An apparatus for providing relative positional information between a spot of radiation and an image projected along a projection light optical path onto an image surface, said apparatus comprising:
at least one projecting means for projecting at least one image along a projection light optical path onto said image surface;
means for providing at least one spot of radiation at at least one location along said projection light optical path;
at least one position sensing means, in known alignment with said projection light optical path, for sensing the position of said at least one spot; and
means, responsive to said alignment of said sensing means with said projection optical path and said sensed position of said at least one spot, for providing positional information about said at least one spot relative to said image on said image surface, wherein:
said projecting means comprises at least two projecting means;
said means for providing at least one spot of radiation comprises an electronic signal applied to one of said at least two projecting means;
said one projector means, responsive to said electronic signal, comprises a means for projecting an image of a spot on said image surface in known alignment with said one of said at least two projecting means, and
said at last one position sensing means is in alignment with the other of said at least tow projecting means, and said positional information comprises positional information of said one of said at least two projecting means relative to the other of said at least two projecting means.

8. An apparatus enabling an operator to interact with a computer, said apparatus comprising:
an image projection system, responsive to said computer, for projecting an image along a projection light optical path on an image surface;
a radiation source, controlled by said operator, for providing at least one radiation spot along said projection light optical path, where position of said spot relative to said optical path is controlled by said operator; and
position sensing means, responsive to radiation from said radiation spot on said optical path, for providing radiation spot position information with respect to said optical path to said computer.

9. The apparatus of claim 8 wherein said computer and image projection system comprise a means for generating a visible image at a position related to the position of said radiation spot.

10. The apparatus according to claim 8 in which said radiation projector projects radiation in the invisible frequency spectrum.

11. The apparatus according to claim 8 in which said radiation projector projects radiation in the visible range.

12. The apparatus according to claim 8 wherein said image surface comprises a reflective screen.

13. The apparatus according to claim 8 wherein said position sensing means comprises a position sensing diode having position outputs and means, responsive to said position sensing diode position outputs, for calculating said position information therefrom and providing said position information to said computer.

14. The apparatus according to claim 8 wherein said radiation spot is adjacent said image surface.

15. The apparatus according to claim 14 wherein said radiation from said radiation spot is reflected radiation and said position sensing means is responsive to said reflected radiation.

16. An apparatus enabling an operator to interact with a computer, said apparatus comprising:
an image projection system, responsive to said computer, for projecting an image along a projection light optical path on an image surface;
a radiation source, controlled by said operator, for providing at least one radiation spot along said projection light optical path, where position of said spot relative to said optical path is controlled by said operator; and
position sensing means, responsive to radiation from said radiation spot on said optical path, for providing radiation spot position information with respect to said optical path to said computer, wherein said image surface comprises a back projection screen.

17. A method for enabling an operator to interact with a computer, said method comprising the steps of:
projecting, in response to said computer, an image along a projection light optical path on an image surface;
providing at least one radiation spot along said projection light optical path, where position of said spot relative to said optical path is controlled by said operator; and
providing, in response to radiation from said radiation spot along said optical path, radiation spot position information with respect to said optical path to said computer.

18. An apparatus for converging beams projected onto an image surface by a multi-beam image projector, said projector having at least two image projector guns, each gun projecting an image onto said image surface, said apparatus comprising:

means for providing a spot at a position on said image surface;

first position sensing means, associated with one of said at least two image projector guns, for sensing the position of said spot relative to the image projected by said one of said at least two image projector guns;

second position sensing means, associated with another of said at least two image projector guns, for sensing the position of said spot relative to the image projected by said another of said at least two image projector guns;

means for comparing said spot position sensed by said first position sensing means with said spot position sensed by said second position sensing means and for providing an error output; and means, responsive to said error output, for adjusting at least one of said at least two projector guns such that the sensed position of said spot is adjusted to predetermined locations relative to the image projected by each of said at least two projector guns.

19. An apparatus for converging beams projected onto an image surface by a multi-beam image projector, said projector having at least two image projector guns, each gun projecting an image onto said image surface, said apparatus comprising:

means, associated with one of said at least two image projector guns, for providing a spot at a predetermined position relative to said image projected by said one of said at least two image projector guns on said image surface;

position sensing means, associated with another of said at least two image projector guns, for sensing the position of said spot relative to the image projected by said another of said at least two image projector guns;

means for comparing said spot position sensed by said position sensing means with the position of the spot projected by said another of said at least two image projector guns and for providing an error output; and means, responsive to said error output, for adjusting at least one of said at least two projector guns such that the sensed position of said spot is adjusted to a predetermined position relative to the images projected by the other of said at least two projector guns.

20. An apparatus for converging beams projected onto an image surface by an image projector, said projector having three image projector guns, each gun projecting an image onto said image surface, said apparatus comprising:

means, associated with one of said three image projector guns, for providing a spot at a predetermined position relative to said image projected by said one image projector gun on said image surface;

position sensing means, associated with each of the other two image projector guns, for sensing the position of said spot relative to the image projected by each of said other two image projector guns;

means for comparing said spot position sensed by said position sensing means with the position of the spot projected by said one image projector gun and for providing an error output; and means, responsive to said error output, for adjusting at least two projector guns such that the sensed position of said spot is adjusted to a predetermined position relative to the images projected by each of said other two projector guns.

21. The apparatus according to claim 20, wherein:

each of said image projector guns includes a projection lens for projecting an image along a projection light optical path;

said position sensing means includes at least two position sensing diode means, each of said at least two position sensing diode means, associated with a respective one of said other two image projector guns and responsive to light received from a respective image along a respective optical path, comprising a means for providing an output indicative of the position of said spot relative to the position of the respective image of a respective said other image projector gun; and said means for comparing is responsive to each of said means for providing an error output.

22. An apparatus for converging beams projected onto an image surface by an image projector, said projector having three image projector guns, each gun projecting an image onto said image surface, said apparatus comprising:

means, associated with each of two of said three image projector guns, for providing respective spots at predetermined locations relative to respective images projected by said two image projector guns on said image surface;

position sensing means, associated with the other of said three image projector guns, for sensing the position of said spots relative to the image projected by said other image projector gun;

means for comparing said respective spot positions sensed by said position sensing means with the locations of the spots projected by said two image projector guns and for providing an error output; and means, responsive to said error output, for adjusting each of at least two of said three image projector guns such that the sensed positions of said spot is adjusted to a predetermined position relative to the image projected by an other of said three image projector guns.

23. The apparatus according to claim 22, wherein:

each of said image projector guns includes a projection lens for projecting an image along a projection light optical path;

said position sensing means includes at least one position sensing diode means, said position sensing diode means, associated with said other image projector gun and responsive to light received from said respective spots on said other image, comprising a means for providing an output indicative of the position of said respective spots relative to the position of said image from said other of said three image projector guns; and said means for adjusting is responsive to said means for providing an error output.

24. A method of converging beams projected onto an image surface by a multi-beam image projector, said projector having at least two image projector guns, each gun projecting an image onto said image surface, said method comprising the steps of:

providing a spot at a position on said image surface;

sensing, in association with one of said at least two image projector guns, the position of said spot relative to the image projected by said one of said at least two image projector guns;

sensing, in association with another of said at least two image projector guns, the position of said spot relative to the image projected by said another of said at least two image projector guns;

comparing said sensed spot positions and providing an error output; and adjusting, in response to said error output, at least one of said at least two projector guns such that the sensed position of said spot is adjusted to predetermined locations relative to the image projected by each of said at least two projector guns.

25. A method of converging beams projected onto an image surface by a multi-beam image projector, said projector having at least two image projector guns, each gun projecting an image onto said image surface, said method comprising the steps of:

providing, in association with one of said at least two image projector guns, a spot at a predetermined position relative to said image projected by said one of said at least two image projector guns on said image surface;

sensing, in association with another of said at least two image projector guns, the position of said spot relative to the image projected by said another of said at least two image projector guns;

comparing said spot position sensed by said position sensing step with the position of the spot projected by said another of said at least two image projector guns and providing an error output; and adjusting, in response to said error output, at least one of said at least two projector guns such that the sensed position of said spot is adjusted to a predetermined position relative to the images projected by the other of said at least two projector guns.

26. A method of converging beams projected onto an image surface by an image projector, said projector having three image projector guns, each gun projecting an image onto said image surface, said method comprising the steps of:

providing, in association with one of said three image projector guns, a spot at a predetermined position relative to said image projected by said one image projector gun on said image surface;

sensing, in association with each of the other two image projector guns, the position of said spot relative to the image projected by each of said other two image projector guns;

comparing said sensed spot positions with the position of the spot projected by said one image projector gun and for providing an error output; and adjusting, responsive to said error output, at least two projector guns such that the sensed position of said spot is at a predetermined position relative to the images projected by each of said other two projector guns.

27. The method according to claim 26, wherein:

each of said image projector guns includes a projection lens for projecting an image along a projection light optical path;

said sensing step includes using at least two position sensing diodes, each of said at least two position sensing diodes associated with a respective one of said other two image projector guns and responsive to light received from a respective image along a respective optical path;

providing an output, indicative of the position of said spot relative to the position of the respective image, for each respective said other image projector gun; and said comparing step is responsive to each of said outputs.

28. A method for converging beams projected onto an image surface by an image projector, said projector having three image projector guns, each gun projecting an image onto said image surface, said method comprising the steps:

providing, in association with each of two of said three image projector guns, respective spots at predetermined positions relative to respective images projected by said two image projector guns on said image surface;

sensing, in association with the other of said three image projector guns, the respective position of said spots relative to the image projected by said other image projector gun;

comparing said sensed respective spot positions with the positions of the spots projected by said two image projector guns and for providing an error output; and adjusting, responsive to said error output, each of at least two of said three image projector guns such that the sensed positions of said spot are adjusted to a predetermined position relative to the image projected by an other of said three image projector guns.

29. The method according to claim 28, wherein:

each of said image projector guns includes a projection lens for projecting an image along a projection light optical path;

said sensing step includes using at least one position sensing diode, said position sensing diode associated with said other image projector gun and responsive to light received from said respective spots on said other image;

providing outputs, indicative of the position of said respective spots relative to the position of said image, for said other of said three image projector guns; and said comparing step is responsive to said outputs.

* * * * *